United States Patent [19]
Wirtz

[11] 3,733,539
[45] May 15, 1973

[54] MULTI-PHASE THYRISTOR INVERTER

[75] Inventor: Rainer Wirtz, Unterriexingen, Germany

[73] Assignee: Robert Bosch GmbH, Gerlingen-Schillerhoehe, Germany

[22] Filed: Mar. 6, 1972

[21] Appl. No.: 232,093

[30] Foreign Application Priority Data

Mar. 24, 1971 Germany............P 21 14 098.7

[52] U.S. Cl....................................321/45 C, 321/18
[51] Int. Cl................................................H02m 7/48
[58] Field of Search....................................321/45 C

[56] References Cited

UNITED STATES PATENTS

| | | | |
|---|---|---|---|
| 3,399,336 | 8/1968 | Koppelmann | 321/5 |
| 3,110,817 | 11/1963 | Frederick | 290/40 R |
| 3,171,966 | 3/1965 | Bergslien et al. | 290/40 R |
| 3,588,667 | 6/1971 | Duff et al. | 321/45 C |

FOREIGN PATENTS OR APPLICATIONS

647,560   5/1963   Belgium..............................321/45 C

*Primary Examiner*—William M. Shoop, Jr.
*Attorney*—Robert D. Flynn et al.

[57] ABSTRACT

To simplify the reset circuitry of multi-phase thyristor inverters having two similar groups of thyristors, one group each controlling the connection of the phases of one polarity, a pair only of reset or quenching circuits are provided, one each output being connected to all the thyristors of a respective group to extinguish the thyristors of the group connected to provide output of the respective polarity during firing thereof. The circuit is preferably connected through an input choke having a plurality of windings in the form of current transformer windings, the additional windings being interconnected with the thyristor circuit to extend current flow through the chokes and provide for smooth commutation.

7 Claims, 3 Drawing Figures

MULTI-PHASE THYRISTOR INVERTER

The present invention relates to a multi-phase thyristor inverter in which the inverter frequency is controlled, preferably a three-phase thyristor inverter to supply three-phase windings of asynchronous motors, to control the operation of the motor from a d-c supply line.

Thyristor inverters have been previously proposed, see, for example, the book Heumann-Stumpe: Thyristoren, 1969, pp. 183 to 188. Reference may also be had to "General Electric SCR Manual," and particularly chapters on choppers, inverters and cyclo converters; and turn-off characteristics and methods.

Various types of turn-off circuits, which may briefly be referred to as quenching circuits, have been proposed. Thyristor circuits in which the firing cycle of the thyristors is controlled to provide a controlled output use different types of quenching or turn-off circuits depending on the type of commutating or firing circuit used. In a simple case, sequential phase extinction is utilized, in which commutating condensers are arranged between the phases. Extinction of any thyristor in an inverter of this type is achieved by the firing of the thyristor of the subsequent phase. This sequential phase on-off circuit does not, however, permit control of firing of the various phases with overlapped voltage (or current) relationship. If overlapped control is desired, each one of the phases must have a separate and individual turn-off circuit associated therewith. This is wasteful of equipment and the attendant maintenance and adjustment thereof.

Inverters which are utilized to control the speed of asynchronous motors require not only change in the output frequency but in the output voltage as well. Output voltage can be varied by controlling supply to the various phases not continuously but, rather, intermittently (in this connection, see particularly the above referred to General Electric SCR Manual). To control the various thyristors of an inverter with a pulse frequency which is high with respect to the output frequency of the thyristor, quenching or turn-off of the thyristor cannot be accomplished by turning off the various phases by sequential turn-off, or by phase turn-off circuits. Individual turn-off of the thyristors then requires that each individual thyristor of the inverter has its own individual quenching circuit. The quenching circuits require substantial additional components and circuitry in connection therewith.

It is an object of the present invention to provide an inverter circuit which has a turn-off circuit in connection therewith which permits control of the various thyristors with overlap, so that the output voltage of the thyristor can be varied as desired, and in which the components and circuitry to effect turn-off is substantially less than if the thyristors are individually quenched.

Subject matter of the present invention: Briefly, a full-wave thyristor inverter is provided in which the thyristors are separated into two groups, one each group providing a half wave of a predetermined polarity. Two turn-off circuits are provided, one for each groups of the thyristors providing the opposite half waves.

This circuit does not permit application of control pulses to the various phases in which the various phases have different mark-space ratios (or different pulse widths). This, however, is not a disadvantage since the phase outputs connected to asynchronous machinery are commonly similarly controlled. The circuit permits control of voltage and frequency of the supply power to an asynchronous machinery without requiring the number and complexity of individual turn-off circuits for individual thyristors themselves.

The invention will be described by way of example with reference to the accompanying drawings, wherein.

Figure 1:
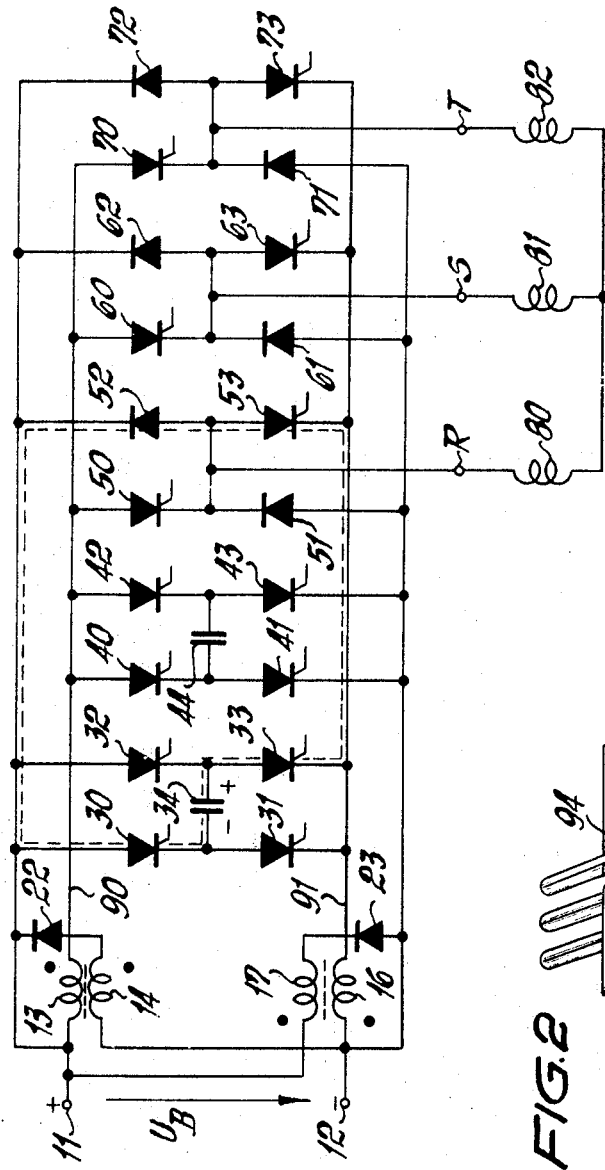
FIG. 1 is a circuit diagram of the first embodiment of the present invention.

Positive and negative supply terminals 11, 12 have a voltage $U_B$ connected thereacross. The terminals 11, 12 can be connected to a battery, or, if the inverter is part of a conversion apparatus, can be connected to the output of a rectifier circuit. Positive terminal 11 is connected over a commutating choke, or reactor 13 to a positive bus 90. Negative terminal 12 is connected over commutating choke, or reactor 16 to negative bus 91. A three-phase bridge inverter, including six thyristors, which are preferably SCR's, 50, 53; 60, 63; 70, 73 is connected between positive and negative buses 90, 91. The diagonal point of the bridge provides the three-phase output terminals R, S, T. A load, schematically shown as the armature windings 80, 81, 82 of an asynchronous machine is connected to terminals R, S, T. The circuit is useful also with loads other than electrical machinery although it is particularly applicable in connection therewith.

Six back-current diodes 51, 52; 61, 62; 71, 72 are connected into the bridge circuit, with reverse polarity. These diodes are not then connected to the positive and negative buses 90, 91 but are rather connected directly to the positive and negative terminals 11, 12.

A push-pull connected turn-off circuit including four SCR's 30, 31, 32, 33 is connected between positive terminal 11 and negative bus 91. The diagonal of the push-pull bridge commutating circuit includes a commutating condenser 34. This commutating bridge is connected to extinguish or turn off the first group of thyristors 53, 63, 73, which are connected to the negative bus 91. A second push-pull turn off bridge circuit having four thyristors 40, 41, 42, 43 is connected between the positive bus 90 and the negative terminal 12. It further includes a commutating condenser 40. The bridge is connected to extinguish the second group of thyristors 50, 60, 70, which are connected to the positive bus 90.

The commutating reactor 13 has a secondary winding 14 wound on the core thereof. Winding 14 is connected at one end with negative terminal 12 and on the second end to a clamping diode, or cut off diode 22, and then to input terminal 11. Similarly, the core of the second commutating reactor 16 has a secondary winding 17 thereon which is connected at one end to the positive terminal 11 and with the second end over a cut-off diode 23 with the negative terminal 12.

Figure 3:
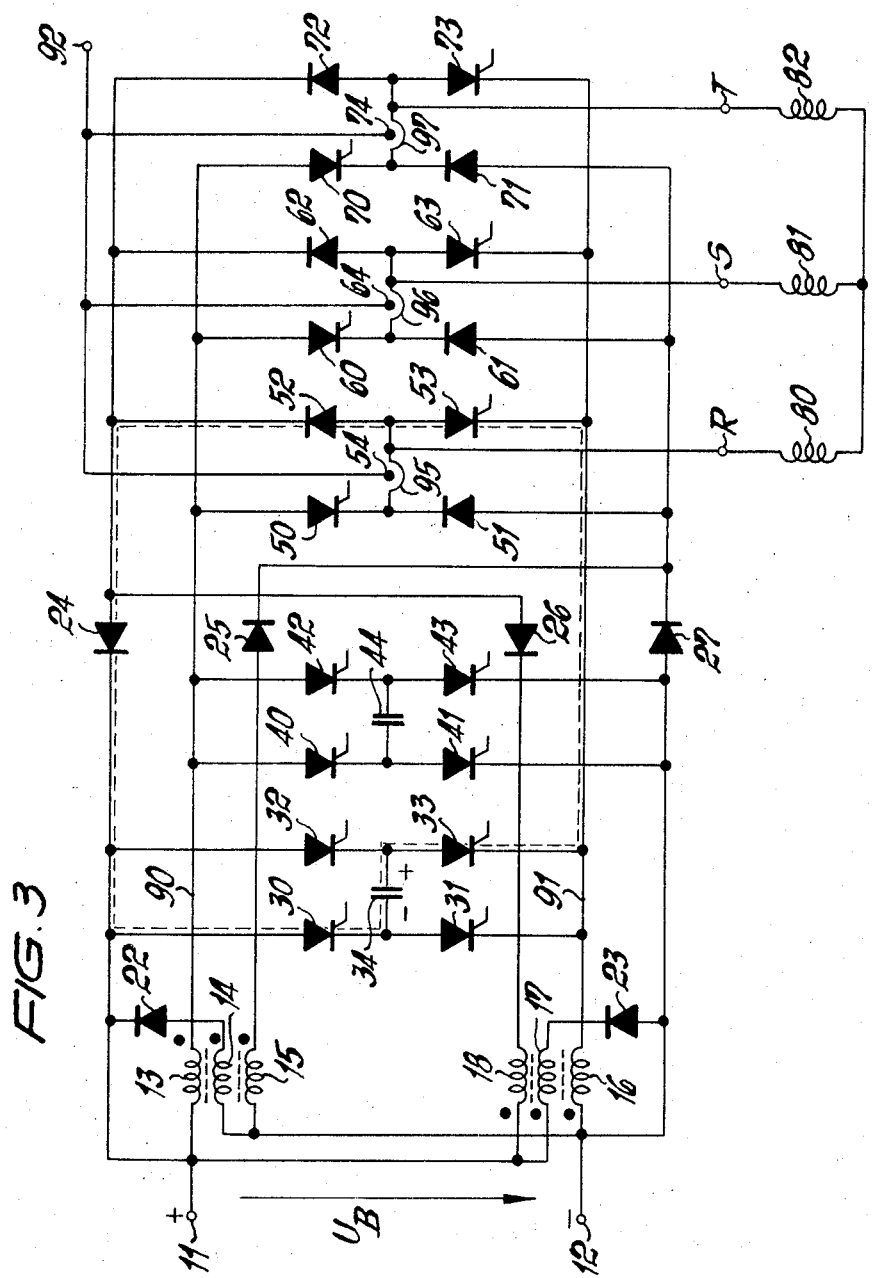
FIG. 3 is a circuit diagram of another embodiment of the present invention.

Referring now to FIG. 3, the diagonal interconnection between the thyristors 50, 60, 70 of one group, and the thyristors 53, 63, 73 of the other is indicated by lines 95, 96, 97. The currents flowing in lines 95, 96, 97 are sensed in a transducer 54, 64, 74 and the sum of the transducer-derived signals are connected to a terminal 92, to provide an output indication of the total power being delivered to the load. The transducers 54, 64, 74, which may be in the form of current transformers or other suitable transducer elements are so connected that the algebraic sum of the currents is being sensed, that is, both phase and polarity being considered when supplying the output signal at terminal 92.

Figure 2:
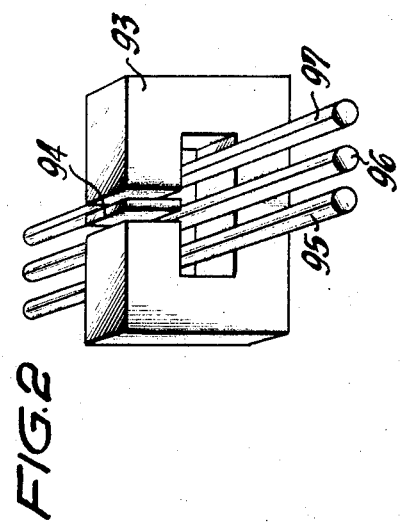
FIG. 2 is a schematic illustration of a current transducer for use in the circuit.

FIG. 2 illustrates a single transducer which is particularly applicable to sense the currents in lines 95, 96, 97, this transducer being useful in either embodiment of FIG. 1 or FIG. 3. Lines 95, 96, 97 are inductively coupled to a common iron core 93 which has an air gap in which a Hall detector 94 is located. The Hall detector 94, connected to terminal 92, then will measure the sum of the currents in the three lines 95, 96, 97, considering the direction of current as well as relative phase. If current flows in one of the lines (for example line 95) which is reversed with respect to the direction of the current in the two other lines, then the effect of the current in line 95 will be subtracted from the effect of the currents in the other lines, so that the output will be truly representative of the algebraic sum of the currents. Rather than using a transducer with a Hall detector, other transducers can be used.

The circuit of FIG. 3 is similar to that of the circuit of FIG. 1, and to the extent that it is identical will not be described again, and the same reference numerals have been used. Lines 95, 96, 97 are connected to the junctions of the thyristors of one group and the associated back-current diodes (for example thyristor 50 and diode 51) so that the total current will be measured flowing in the respective phase, that is, not only the current due to the thyristor itself but also the current flowing through the back diode. The circuit, in essence, is similar except that in the lines between the back diodes 51, 61, 71 and 52, 62, 72, additional diodes 27, 24, respectively, are connected. Further, the cores of the commutating reactors 13, 18 have an additional tertiary winding 15, 18, respectively, placed thereon. Winding 15 is connected to negative terminal 12 on one end, and at the other end to a third diode 25 and then to the junction between diode 27 and the back diodes 51, 61, 71. Similarly, the tertiary winding 18 is connected to positive terminal 11 on one end and at the other to a diode 26 which connects to the junction of diode 24 and back diodes 52, 62, 72.

Operation: The basic operation of a three-phase controlled bridge is known. The gates of the thyristors 50, 60, 70 and 53, 63, 73 are suitably supplied with firing potentials to provide cyclical firing thereof, in dependence on control signals, derived from a firing control source (not shown) and known in the art. Upon firing of a thyristor, for example thyristor 50, phase terminal R is supplied with power for the positive half wave. Upon firing of thyristor 53, the negative half wave is provided to terminal R. The amplitude of the supply voltage can be varied such that the thyristor 50, or 53, respectively, fires, or is extinguished in predetermined timed relationship. The supply voltage increases with increase of the ratio of pulse duration ("mark") to pulse interruption ("space"). Thyristors 53, 63, 73, all connected to the negative bus 91 and which, together, can provide a negative half wave, are all extinguished, together, by the first quenching bridge 30–34. The quenching or turn-off circuit thyristor 53 is indicated in FIGS. 1 and 3 in dashed lines.

Let it be assumed that, in advance of extinction, commutating condenser 34 is charged as shown in FIG. 1, that is, its left terminal is charged negatively, and its right terminal positively. If thyristors 30, 33 are fired (under control of an outside firing source controlling extinction of the main thyristors), commutating condenser 34 will be connected over thyristor 30 and back diode 52 to the anode of the thyristor 53 which is to be extinguished; and further, over thyristor 33 connected to the cathode of thyristor 53 (see broken line circuit). Since commutating condenser 34 previously had been charged to the supply voltage $U_B$, the voltage $U_B$ is applied, in reverse direction, to the thyristor 53, thus blocking thyristor 53. Thyristors 30 and 33 then are effective to charge the commutating condenser with reverse polarity, so that the right terminal will now be negative. The next blocking is then done over thyristors 31 and 32.

In case one of the thyristors 63 or 73 were conductive together with thyristor 53, the additional thyristor, or thyristors are also blocked upon discharge of condenser 34. Thus, all thyristors of one group which were conductive are interrupted. If, during the same half wave, thyristor 53 should be additionally interrupted after further firing, the other thyristors 31, 32 of the first bridge should be fired in order to have positive condenser potential available to be applied to the cathode of thyristor 53.

If the load is an asynchronous machine which is operating in braking mode, it can be possible that all six thyristors 50, 53; 60, 63; 70, 73 of the three-phase bridge are blocked simultaneously. Only the back diodes 51, 52; 61, 62; 71, 72 will carry current derived from the motor, now acting as a generator. The braking energy is being supplied back to the battery. Current measurement is obtained at terminal 92, as before indicated, for use in indicating or control functions.

The operation of the commutating reactors 13, 16 and of secondary windings 14, 17 is known. During the above described quenching, the polarity of the negative bus 91 is briefly reversed. The commutating reactor 16 is used to prevent short-circuiting of the positive pulse arising at the cathode of thyristor 33 to the negative terminal 12. Upon quenching, the commutating reactor 16 will have a rise in current occurring therein. The magnetic energy stored in the reactor, or choke 16 is delivered back over secondary winding 17 and cut-off diode 20 to the source of direct potential. Similarly, protective reactor 13 is utilized to suppress negative voltage pulses on the positive bus 90. The magnetic energy which is stored in reactor 13 is applied over secondary winding 14 and cut-off diode 21 back to the source of direct current.

The quenching circuit for thyristor 53 is also shown in FIG. 3, which includes an additional tertiary winding in the choke. The diodes 24, 27 are so poled that the quenching current for the thyristors will pass therethrough, that is, they are poled similarly to the back diodes to which they are connected. The winding ratio between the various windings of the reactors is preferably so selected that the turn ratio between windings 16 and 17 is preferably between 2 : 1 and 4 : 1; this ratio is, hereinafter, referred to by $r$. The tertiary winding 18 preferably has the same number of turns as that of the primary, that is, of winding 16.

During quenching, as above explained, the negative bus 21 will have a positive pulse (with respect to the negative terminal 12) applied thereto. After reverse of the polarity on condenser 34, the secondary winding 17 as well as the tertiary winding 18 will provide a negative voltage pulse at the right terminal thereof. The negative voltage pulse of the secondary winding is carried along over the cut-off diode 23 to the negative terminal 12. The negative pulse of the tertiary winding 18, however, is connected over diode 26 and back diode 52 to the phase terminal R. This phase terminal R was supplied with negative current until just before the extinction of thyristor 53. After this extinction, therefore, an additional negatively directed current is provided from the tertiary winding 18. This current, of course, decreases exponentially. The embodiment of FIG. 1, also, provides a negative current to the phase terminal R after extinction of the thyristor 53 over back current diode. This current is due to the voltage provided by the leakage induction of windings 80, 81, 82 of the rotating motor load and by the voltage of commutating reactor 13, limited to the induction voltage $(1/r) \cdot U_B$. The second embodiment in accordance with FIG. 3 provides a third voltage from the tertiary winding 15. If, for example, at first thyristors 53 and 70 are conductive, and thereafter thyristor 53 is extinguished, motor current continues due to the inductivity of the motor and the induction voltage limited to $(1/r) \cdot U_B$ to the second commutating reactor 13 in the following circuit: R-80-82-T--70-13-24-52-R.

After change of polarity of commutating condenser 34 due to quenching, the dot terminal of tertiary winding 18 will likewise have a voltage of $(1/r) \cdot U_B$ arising thereacross. This voltage is coupled over diode 26 into the above given circuit and adds to the current due to the induction voltage of the first commutating reactor 13. Thus, the current within the above given circuit, that is, within the braking of free-wheeling circuit will continue longer than in the embodiment in accordance with FIG. 1 which does not have a tertiary winding on the reactor.

If all thyristors are extinguished, for example during braking operation of the asynchronous machine represented by the load 80, 81, 82, and motor current is fed back to the direct current terminals 11, 12, over the back diode, the additional tertiary windings provide for an increase in driving voltage. The voltages of the tertiary windings will add to the other voltages, particularly to the voltage of the asynchronous machine now operating as a generator, so that the back current attenuates more slowly.

The second embodiment (FIG. 3) permits setting of the trigger pulses to fire the thyristors at greater time intervals, that is, the various thyristors are less often fired during any one half wave, so that the power loss in the thyristors in the three phase bridge, as well as in the extinguishing bridges is reduced.

In a preferred arrangement, the turns ratio of the windings should be 2 : 1 to 4 : 1 between the commutating windings 16 and secondary 13; if the ratio is too small, for example 1 : 1, too much excess voltage will appear on the negative line 91 with respect to the negative terminal 12 after the thyristor 53 has extinguished. On the other hand, if the turns ratio should be too great, then the magnetic energy within the reactor 16 will decrease too slowly, and the repetition frequency of the extinction or blocking pulses cannot be selected to be sufficiently high.

The firing and extinction sequences of the other thyristors are similar to those of thyristor 53, above referred to, so that they need not be described in detail. The voltage, as well as the frequency of the supply power to the three-phase terminals R, S, T can be selected as desired, and the requirement with regard to components, and circuitry is much less than inverters in which each of the thyristors have their own, individual quenching circuit. If each individual power thyristor would have a separate quenching circuit, then six separate quenching bridges would be required. Instead of the two quenching bridges 30–34 and 40–44, other quenching circuits can be used as commonly known in controlled rectifier technology (see the above referred to SCR Handbook). In accordance with the invention, only one turn-off circuit is provided for each group of thyristors providing a half wave of a predetermined polarity.

The thyristors of one group need not be just three; if six-phase a-c is to be generated, each group will have six thyristors; nevertheless, only a single turn-off circuit is required for each group.

The tertiary windings 15, 18 decrease the current attenuation in the windings 80, 81, 82 of the asynchronous machine during the pulse intervals of the thyristors. These thyristors thus need not be fired as often, which improves the efficiency of the inverter as well as that of the motor.

The arrangement of a single transducer in accordance with FIG. 2 within the inverter having grouped extinction circuits is particularly simple since a single measuring unit can measure the sums, that is, the algebraic sums of all currents flowing in the motor. This is a sensed value which is completely sufficient for current regulation of the inverter, since, in any case, all thyristors of one group are extinguished simultaneously.

The firing circuits for the thyristors are known in the art, and may comprise separate sources, or sources controlled by outside controllers, or placed in a feedback loop, which may, if desired, include a sensed quantity from the motor itself.

Various changes and modifications may be made within the inventive concept.

I claim:

1. Multi-phase thyristor inverter adapted to be connected to a source of d-c potential and providing multi-phase a-c output comprising two similar groups (50, 60, 70; 53, 63, 73) of at least two thyristors each, the thyristors of one group being connected to the positive potential of the source and the thyristors of the other group being connected to the negative potential of the source, the groups of the thyristors being connected to provide multi-phase full-wave output (S, R, T);

a pair of switchable turn-off circuits (30–34; 40–44) having bi-polar outputs, the output of one switchable turn-off circuit being connected to all thyristors of a respective group and the output of the other switchable turn-off circuit being connected to all the thyristors of the other group to extinguish the thyristors in the respective group after firing thereof;

back-current diodes (51, 61, 71; 52, 62, 72) directly connected in opposite polarity in circuit with the respective thyristors and the d-c source, the output for each phase (S, R, T) being taken from the interconnection (59, 96, 97) between the respective thyristor and the associated back-current diode; and current sensing means (54, 64, 74; 93, 94) coupled to said interconnection to sense the total current flowing in a respective phase, the current sensing means having a common output (92) to provide an output signal representative of total current flow in the respective phases.

2. Inverter according to claim 1, for use in a three-phase network to supply a motor, comprising at least three thyristors for each group, one of each being connected to a phase of a respective phase winding of the motor;

the common output (92) from the current sensing means providing an output signal representative of total current flow in the motor.

3. Inverter according to claim 1, wherein the current sensing means comprises a core (93) having an air gap and conductors (95, 96, 97) carrying the currents of all the phases of the motor coupled to the core so that the flux through the core will be representative of total motor current; and a Hall detector (94) in said gap, the Hall detector providing said output signal.

4. Inverter according to claim 1, comprising a pair of commutating reactors (13, 14; 16, 17), one each in series connection between the source of d-c potential and the positive and negative supply to the groups of thyristors, said reactors having secondary windings (14, 17), the secondary windings and the reactor being associated with a common core; and a series of interconnections between the positive (11) and the negative (12) terminals of the source, each being connected to a respective secondary winding (14, 17) and a blocking diode (22, 23) connected to the other terminal of the secondary winding and poled in blocking direction with respect to the d-c source.

5. Inverter according to claim 1, including common connected diodes (24, 27) poled similarly as said back current diodes interconnecting said back current diodes and the positive and negative terminals of the source.

6. Inverter according to claim 5, comprising a pair of commutating reactors (13, 14; 16, 17), one each in series connection between the source of d-c potential and the positive and negative supply of the groups of thyristors, said reactors having secondary and tertiary windings (15, 18), and respective tertiary diodes (25, 26) connected with the respective tertiary winding and to the junction of the common connected diode (22, 27) and the back current diodes (51, 61, 71; 52, 62, 72).

7. D-c to three-phase a-c inverter in combination with an a-c motor having at least three phase windings comprising two groups of at least three thyristors each (50, 60, 70; 53, 63, 73), each group of thyristors supplying a half wave of the three phase supply to the motor, the thyristors of each group being connected with one terminal to a respective terminal of the d-c source, the other terminals of the thyristor being connected to a phase winding (80, 81, 82) of the motor; and two turn-off circuits, one for each group of thyristors, one each circuit being common to the thyristors of each group and comprising switchable quenching condenser means (30–34; 40–44) and diode means (51, 61, 71; 52, 62, 72) one for each of the turn-off circuits and the groups of the thyristors, the diode means being poled oppositely with respect to each other and to the thyristors to permit turn-off voltage from the turn-off circuits to be applied to all the thyristors of a group and to extinguish the thyristors of the group supplying opposite half waves to the motor windings;

a commutating reactance in series with the connection from the d-c supply to the one terminal of the thyristors, said commutating reactance having an additional winding (15, 18) poled similarly to the series-connected winding; and diode means (24, 26; 25, 27) similarly poled and interconnecting the additional winding with said diode means and the terminals of the d-c source, said diode means being poled to permit gradual decay of current flow due to change of current flow through the commutating reactance and thus extend current flow through the windings of the motor.

* * * * *